Oct. 29, 1957 J. JULIE 2,811,588

CONTROL APPARATUS

Filed March 11, 1954 3 Sheets-Sheet 1

INVENTOR,
Joel Julie
BY
Watson, Cole, Grindle & Watson,
ATTORNEYS.

INVENTOR,
Joel Julie
BY
Watson, Cole, Grindle & Watson,
ATTORNEYS.

Oct. 29, 1957 J. JULIE 2,811,588

CONTROL APPARATUS

Filed March 11, 1954 3 Sheets-Sheet 3

INVENTOR,
Joel Julie

BY Watson, Cole, Grindle & Watson,
ATTORNEYS.

United States Patent Office 2,811,588

Patented Oct. 29, 1957

2,811,588

CONTROL APPARATUS

Joel Julie, Scranton, Pa., assignor to Daystrom Instrument Division of Daystrom, Incorporated, Archbald, Pa., a corporation of New Jersey Application March 11, 1954, Serial No. 415,668

9 Claims. (Cl. 179—100.1)

Figures 1, 2, 3:
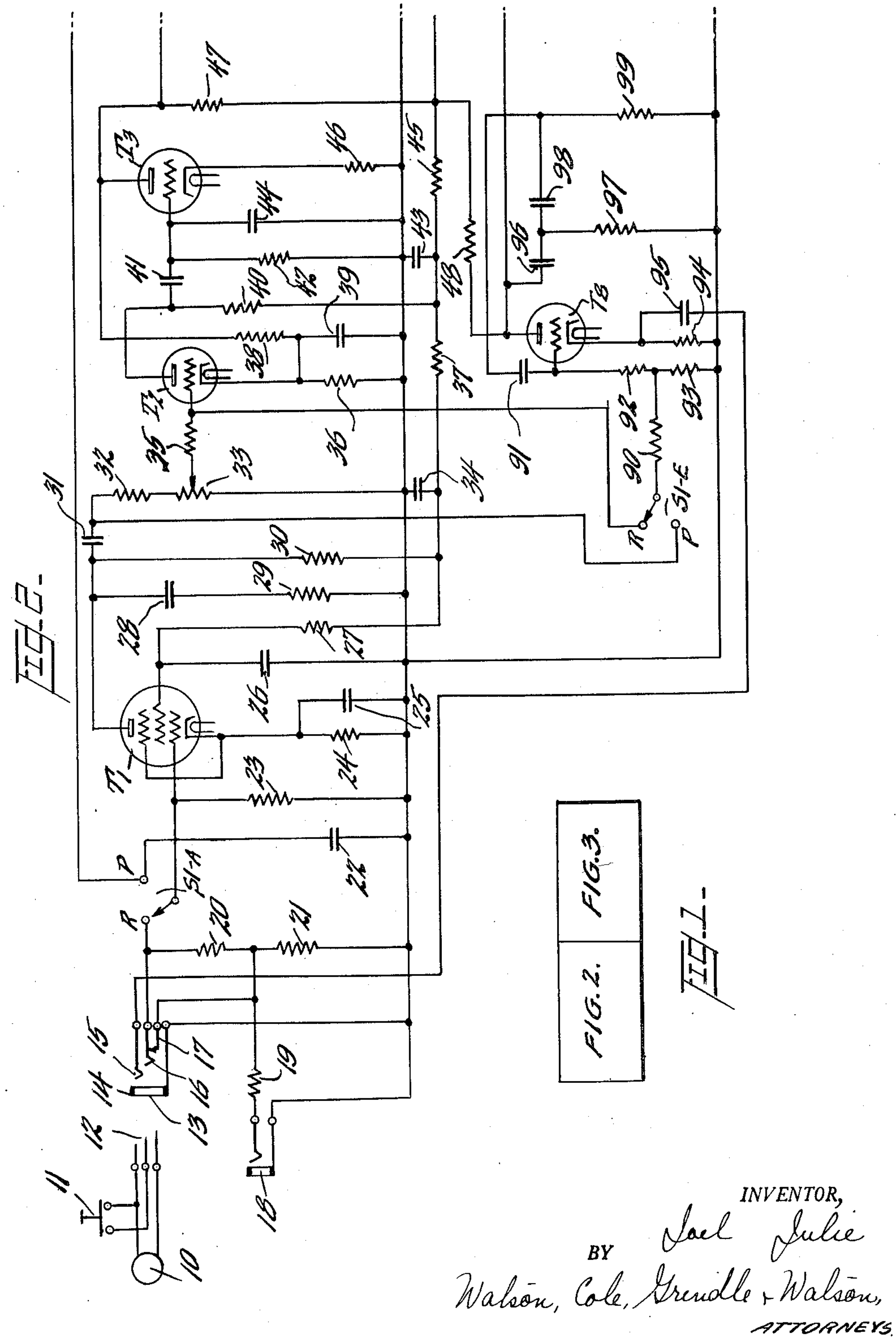
Figure 3:
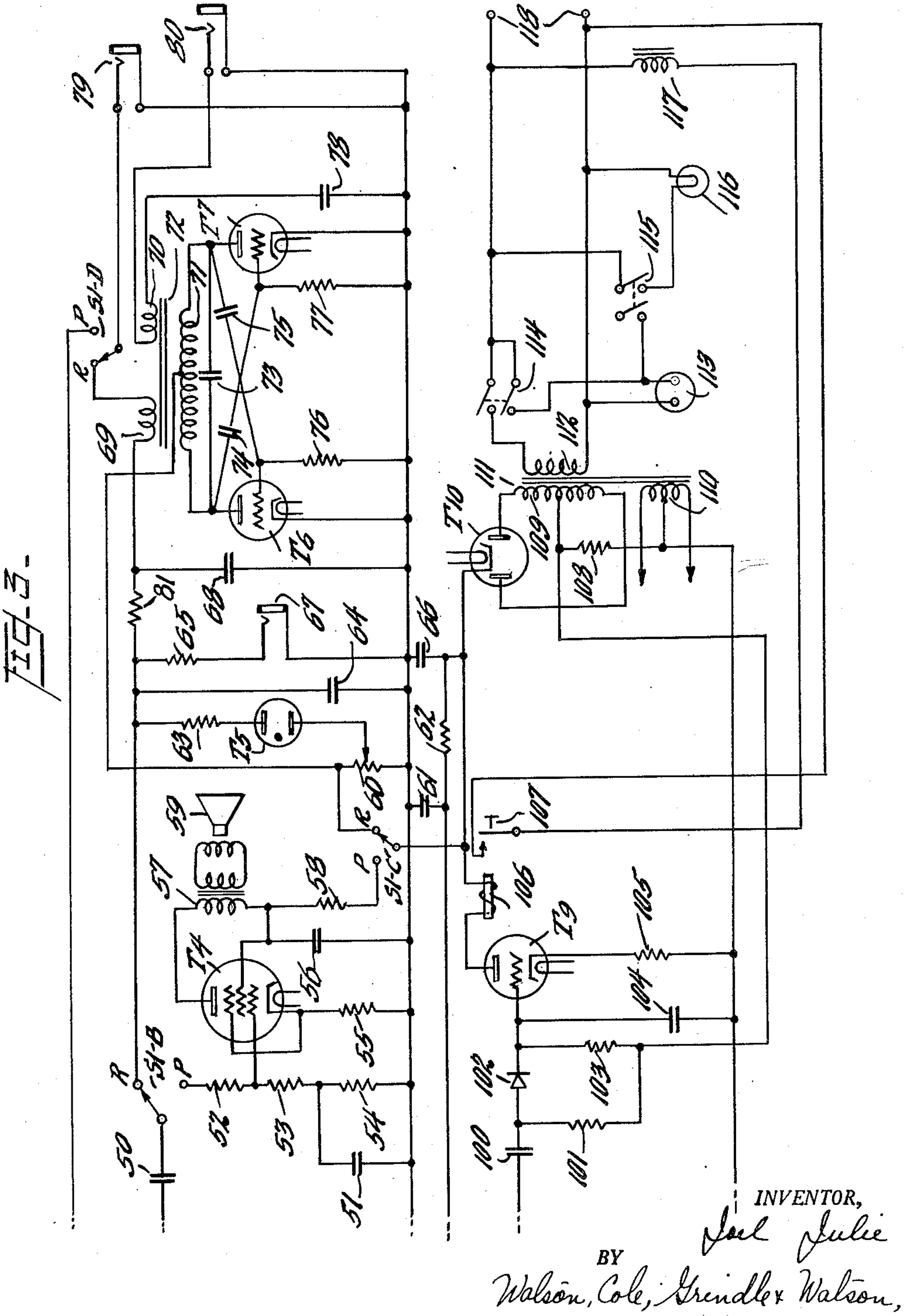

This invention relates to improved apparatus for operating a control device in a programmed relationship with respect to information reproduced from a recording. Apparatus of this type is advantageously used, for example, to establish an operative time relationship between visual demonstration equipment and an associated sound track.

To illustrate the principles of this invention, specific structural embodiments are shown and described hereinafter which operate the slide changing mechanism of a movie slide projector in correspondence with a reproduced sound track of magnetic wire or tape having a plurality of sequentially recorded sound sections, each appropriately associated only with a particular slide to be projected. From a generic aspect, however, the principles of this invention are useful in many other applications wherein a control device is to be automatically operated at specific times with reference to recorded sounds.

In the prior art, recording techniques have heretofore been proposed wherein a plurality of individual sound recordings are sequentially recorded with intervening control markers. The control markers are utilized to actuate a control device in a desired time relationship relative to the reproduced records. In other modified arrangements, the control markers are superimposed upon the sound track to produce the requisite control. With either arrangement, in order to prevent objectionable interference between the control marker signals and the sound signals, the recorded control markers are of a single frequency either above or below the requisite audio range of the sound signals so that they can be distinguished from the sound frequencies by suitable filtering devices.

Prior art structures for preparing the requisite composite recording have generally comprised an audio amplifier with at least dual signal inputs, and a single recording head output. A microphone, radio, or phonograph was connected to one of the inputs to record the sound signals, and a single-frequency oscillator for generating the control marker signals was connected to the other input. With this arrangement, message signals and control marker signals were recorded on a composite record. During the reproduction phase, signals from the composite recording were applied to the amplifier input to actuate a loud speaker which was now connected to the amplifier output. An additional band-pass amplifier narrowly tuned to the frequency of the control marker signals was connected to a second output for the audio amplifier to produce a signal for actuating the control device in response to the recorded control markers without interference from the sound frequencies.

In many applications the complexity of the foregoing structure, together with the attendant high cost, made impossible the application of such equipment in installations wherein it was otherwise admirably suited.

Accordingly, a principal object of this invention is to provide a composite structure economical in design which during a recording operation can record the sound signals and also generate and record the required control markers in any desired time relationship; and during a reproducing operation selectively amplify the control markers to produce a reliable control exclusively responsive thereto, and at the same time actuate a loud speaker or other sound device in response to the sound signals.

A first structural embodiment of this invention contemplates the use of an audio amplifier with a microphone input for recording sound signals, and a low-frequency oscillator connected to said audio amplifier for generating the control markers at the appropriate times in response to the manual operation of a microphone push-button switch. A magnetic recording head connected to the amplifier output records both signals upon conventional magnetic tape or wire. During the reproduction or playback phase, the composite signals generated by the reproduction head are applied to the audio amplifier input and the oscillator is converted into a narrow band-pass amplifier at the oscillator frequency, whereby a slide changing mechanism is actuated in response to the selectively amplified control markers without interference from the reproduced sound signals which actuate a loud speaker. The conversion of the marker signal oscillator into a band-pass amplifier during reproduction represents an improved and economical use of circuit components.

A second structural embodiment of the invention includes another feature which represents added efficiency and economy in the use of structural components. In particular, the audio power stage which is operative only during reproduction to actuate a loud speaker, is converted during the recording phase into a high-frequency oscillator for generating the magnetic biasing and erase currents.

Figure 4:
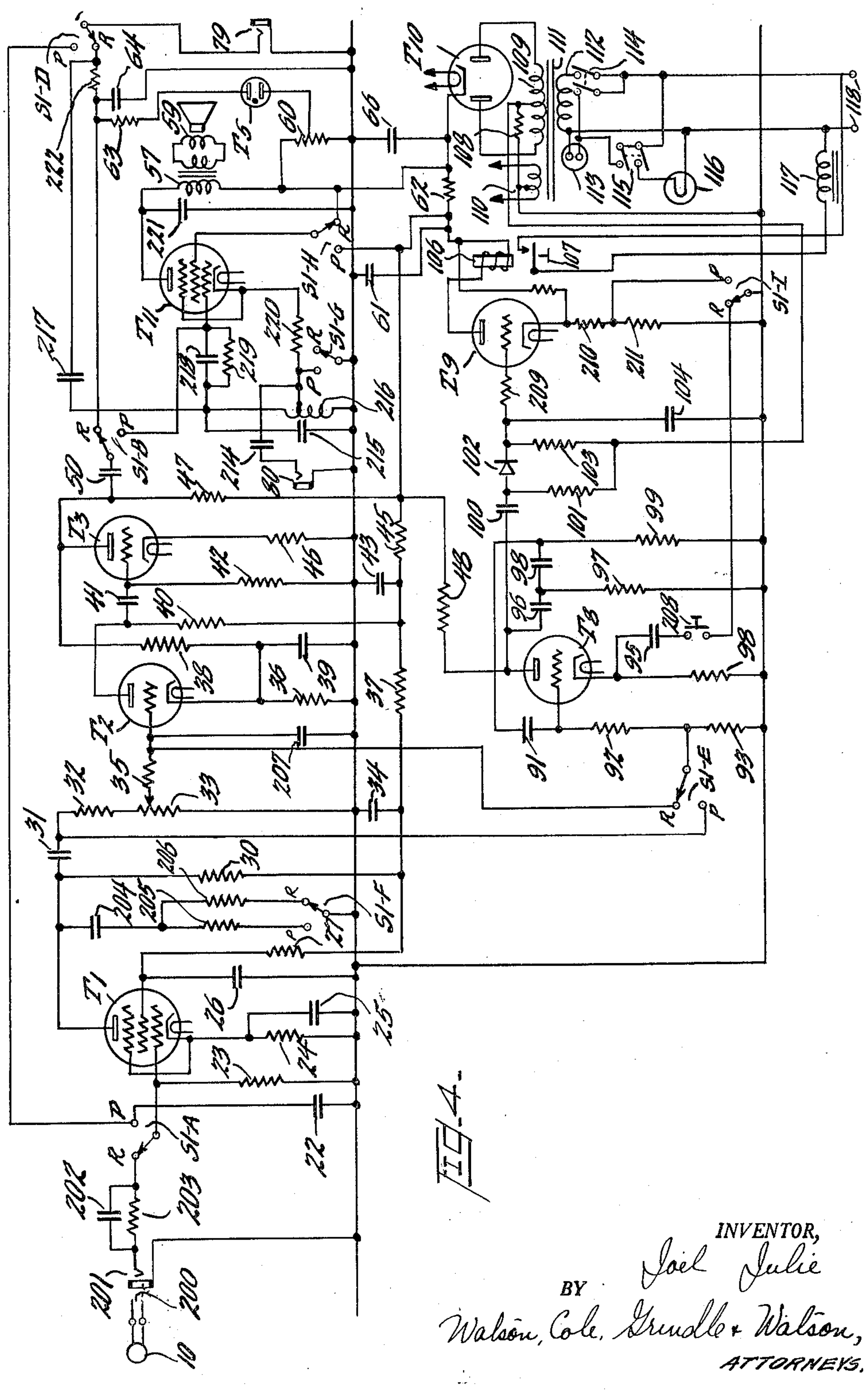

In order that all of the features of this invention and the mode of operation thereof may be readily understood, a detailed description follows hereinafter with particular reference being made to the drawings wherein:

Fig. 1 is a diagram showing the proper assembly of the drawing sheets containing Figs. 2 and 3 so that a complete schematic diagram of a first embodiment of this invention may be viewed;

Figs. 2 and 3, when assembled in accordance with the diagram of Fig. 1, is a schematic diagram of a first embodiment of the apparatus of this invention; and Fig. 4 is a schematic diagram of a second embodiment of this invention.

The first embodiment of the invention shown by combining Figs. 2 and 3 in accordance with Fig. 1 provides for the sequential recording of a plurality of sound signals with intervening control markers when record-playback switch S1 having ganged sections A to E is positioned to the record or R position. Signals generated by microphone 10 are recorded by inserting plug 12 into microphone-input jack 13, and the closure of microphone push-button switch 11 at the appropriate times provides for the generation and recording of the control markers which separate the sequentially recorded sound signals.

Phonograph-radio input jack 18 provides an additional input connection for simultaneously recording any desired phonograph or radio signals which might be desired as background to the microphone signals, or for recording phonograph or radio signals only when microphone 10 disconnected. Input jacks 13 and 18 are therefore appropriately interconnected by means of the bridging network comprising resistors 19, 20 and 21 so that signals may be applied simultaneously or individually from each of the jacks to the control grid of pre-amplifier tube T1 through switch section S1–A. In the event an input signal is applied only to jack 18, tip contact 16 and contact 17 of jack 13 are closed one to the other whereby the tip contact for jack 18 is connected directly to the control grid of tube T1 through resistor 19.

The momentary closure of push-button switch 11 at the termination of a first recorded sound signal and prior to the recording of a second sound signal connects sleeve 14 of jack 13 to ring contact 15, whereby tube T8 and its associated components is converted into an oscillator for generating intervening control marker pulses as is hereinafter explained in detail. In the specific input circuitry shown, control markers are recorded only in conjunction with microphone signals. Obvious circuit modifications can be made so that control markers can be recorded when only phonograph or radio signals are recorded.

The input sound signals are amplified, before application to a record-playback head connected to jack 79, by a three-stage audio amplifier comprising tubes T1, T2 and T3 together with their associated components.

The input to tube T1 is shunted by capacitor 22 during playback to provide treble equalization at the amplifier input by tuning the playback head to resonance and resistor 23 provides the usual grid-return path. A fixed cathode bias potential for tube T1 is developed by resistor 24 and its shunting capacitor 25. Capacitor 26 and resistor 27 provide an additional filter for the direct-current potential applied to the screen grid of tube T1. The audio signal developed by tube T1 appears across plate resistor 30, and serially-connected capacitor 28 and resistor 29 connected from plate to ground provide for base equalization in the output of tube T1. The filter section comprising capacitor 34 and resistor 37 provide additional filtering for the direct-current potentials applied to the anode and screen grids electrodes of tube T1.

The audio signal developed across plate resistor 30 is applied to serially-connected capacitor 31, resistor 32 and potentiometer 33. The relative position of the movable tap of potentiometer 33 determines the signal level applied to the control grid of tube T2 through isolation resistor 35. A fixed cathode-bias potential for tube T2 is developed by resistor 36. The audio signal developed by tube T2 appears across plate resistor 40. The filter section comprising capacitor 43 and resistor 45 provides additional filtering for the energizing potentials applied to tubes T1 and T2.

The audio output signal developed by tube T2 is applied to the input circuit for amplifier tube T3 through the network comprising capacitor 41 and resistor 42. The input to tube T3 is shunted by capacitor 44 to shunt stray bias voltages. Cathode resistor 46 is not by-passed and therefore degenerative feedback is developed in the cathode circuit for this stage. High-frequency equalization is obtained by the negative feedback loop provided by connecting the anode of tube T3 to the cathode of tube T2 through resistor 38, and shunting 36 by 39 for high frequencies.

The audio signal developed across plate resistor 47 during recording is applied to the tip contact of jack 79 through capacitor 50, switch section S1–B, resistor 81, secondary winding 69 of transformer 72, and switch section S1–D, thereby energizing the recording head connected to jack 79 and producing a magnetic recording in the conventional manner. A visual indication of the recording signal level for the amplifier comprising tubes T1, T2 and T3 is provided by neon-type gas tube T5 which is connected to switch section S1–B through resistor 63, and to ground through the lower tapped portion of potentiometer 60. Switch section S1–C applies a direct-current potential from the cathode of full-wave rectifier tube T10 to potentiomter 60 whereby different values of divided potential adjust the level of the visual monitoring rendered by tube T5. Audio monitoring during recording is accomplished by inserting a loud speaker or headphone plug into jack 67 which is connected to a ground, and to switch contact section S1–B through resistor 65.

The record-playback head connected to jack 79 is biased by high-frequency alternating current applied thereto by secondary winding 69 of transformer 72. A low impedance path to ground for this bias current is provided by capacitor 68. The erasing of a magnetic recording is accomplished by connecting a conventional erase head to jack 80. Secondary winding 70 of transformer 72 develops the requisite high-frequency erase current, and capacitor 78 provides a ground return path for this erase current. Tubes T6 and T7, together with their associated components 71 to 77, comprise a conventional high-frequency oscillator for generating the requisite bias and erase currents. The direct-current energizing potential for this oscillator is supplied from the cathode of full-wave rectifier tube T10 through switch section S1–C and the center tap connection for primary winding 71 of transformer 72.

During recording, the positioning of switch section S1–B to the R position removes any signal input from the audio power stage comprising tube T4 and its associated components so that no signal is produced by loud speaker 59. The corresponding positioning of switch section S1–C removes the anode and screen grid potentials which would otherwise be applied to tube T4 through resistor 58.

The requisite low-frequency alternating currents forming the control markers are obtained by causing tube T8 and its associated components to oscillate momentarily as a phase-shift oscillator in response to the manual closure of microphone push-button switch 11 at the appropriate times during recording. The anode of T8 is connected to the control grid of tube T8 by a resistor-capacitor network comprising sections (96—97), (98—99), and (91—92, 93). It is well known that a phase-shift oscillator, having three balanced resistor-capacitor phase-shift networks, will oscillate only when the gain of the amplifier is at least 29 to overcome this amount of attenuation in the resistor-capacitor networks and make the loop gain equal to unity. Tube T8 is selected as to characteristics so that it will supply a gain in excess of 29, provided cathode resistor 94 is bypassed. This bypass is provided by the manual closure of push-button switch 11, thereby contacting sleeve 14 to ring contact 15.

As soon as the cathode by-pass is removed by opening switch 11, the gain of the stage drops below 29 as a result of the negative feedback produced by the unbypassed cathode. Consequently, there is insufficient negative feedback to sustain oscillation; there is, however, sufficient feedback to peak the gain of the stage at the oscillation frequency thereby causing the stage to act as a single frequency band-pass amplifier. While the peak gain of such a stage appears to be limitless theoretically, it is desirable in practice to limit the peak amplifier gain to approximately 40 decibels for the following reasons. First, it is not advisable to operate too closely to the point of oscillation due to variation in gain as a result of line voltage fluctuations. Second, as the peak gain is increased, the band pass becomes too narrow for proper synchronization when tube T8 acts as amplifier during reproduction, and a slight change in tape speed may be sufficient to throw the circuit out of synchronism.

The oscillator output signal is applied to the control grid of tube T2 through isolating resistor 90. It should be noted that this output is applied to the audio amplifier comprising tubes T1, T2, T3 after volume control potentiometer 33. With this arrangement and isolation resistor 35, the control marker pulses are not affected by any particular volume control setting, and the output signal level of the oscillator can be adjusted so that the control markers are recorded at the saturation or maximum level for the magnetic recording tape or wire used.

As will be hereinafter explained in detail, during the reproduction phase, tube T8 and its associated components act as a single-frequency bandpass amplifier for the recorded control marker pulses, whereby after suitable rectification and amplification of the output thereof the winding of slide relay 106 is energized, thereby closing the associated contact and completing an energizing circuit for slide solenoid 117. It is therefore obvious that the control marker frequency has to be outside of the normal signal passband of the amplifier comprising tubes T1, T2 and T3, otherwise no amount of filtering could separate the sound and marker signals and the slide relay could be erroneously energized by the sound signal frequencies.

On the other hand, the control marker frequency should be sufficiently close to the passband of the amplifier tubes T1, T2 and T3 in order to make the recording and reproduction of the control marker signals possible. The normal passband of a recording amplifier, for example, at a tape speed of 7.5 in./sec. would be of the order of 50 to 7,000 C. P. S. At these two extremes of frequency the response would be attenuated approximately 4 db. At the outset it would appear that two choices for the control marker frequency are available, that is, a frequency slightly above 7,000 C. P. S. or one just below 50 C. P. S. From a practical aspect, however, the frequency choice above 7,000 C. P. S. would prove very unreliable and impractical. This is because the unequalized response curve of a magnetic recording system follows a rising output curve up to a particular frequency, at which point the response begins to slope off and drops to zero at a frequency $fc$ defined by the relationship $$fc=\frac{v}{l},$$

where $v$=velocity of tape in in./sec., and $l$=gap length. The frequency $fc$ is always of the same value provided the tape speed and gap length remain fixed.

While it is possible to keep the speed constant, it is not possible to keep the gap value constant because the effective gap length increases with wear. The usual result of head wear is to lower the $fc$ frequency. Accordingly, there is no reliable way for setting the marker signal near the high frequency cut-off with assurance that the marker frequency will be amplified sufficiently over the service life of the head.

The low-frequency response of the head is unaffected, however, by the wear of the head. Furthermore, when a control marker having a high frequency is chosen, the system can only work with one tape speed, as $fc$ changes with tape speed. By selecting a marker frequency below 50 cycles per second, the system will operate for varied tape speeds independently of head wear.

In the preferred embodiment shown in combined Figs. 2 and 3, a marker frequency of approximately 45 cycles per second was chosen. At this frequency point, the equalized response of the system is attenuated approximately 6 decibels. Therefore, the possibility of transmitting speech or music signals at this frequency through tube T8 with sufficient amplitude to erroneously actuate slide relay 107 is slight. The marker frequency, however, is always recorded at the maximum amplitude the tape will admit because tubes T2 and T3 do not attenuate the relatively strong local oscillator output of tube T8 below the saturation level for the magnetic tape or wire.

When switch S1 is positioned to the playback or P position, the signals generated by the record-playback head connected to jack 79 are applied to the control grid of tube T1 through switch section S1–D, and the resulting audio output developed across plate resistor 47 for tube T3 is applied to the control grid of audio power tube T4 through capacitor 50 and resistor 52. The transfer of switch section S1–C from the R to the P position removes the direct-current energizing potential from the high-frequency oscillator comprising tubes T6 and T7 and applies it to tube T4 through resistor 58. Capacitor 56 provides additional filtering for this potential. The audio signal developed at output transformer 57 actuates loudspeaker 59, thereby reproducing the sound signals. The network comprising resistor 53, capacitor 51 and resistor 54 provides base equalization at this power audio stage.

The reproduced control marker pulses are also amplified by tube T1 and thereafter applied to the control grid of tube T8 through capacitor 31, switch section S1–E, resistor 90 and resistor 92. In view of the fact that cathode resistor 94 for tube T8 is unbypassed during reproduction, tube T8 and its associated components selectively amplifies the control marker frequencies, and applies the amplified signal to the control grid of tube T9 through capacitor 100 and diode 102. Diode 102 is so poled that only positive signal alternations integrated by capacitor 104 are applied to tube T9. Resistor 101 provides a discharge path for capacitor 100, and resistor 103 provides a grid return to ground through resistor 108. Tube T9 is negatively biased by a combination of self bias developed across cathode resistor 105 and fixed bias developed across resistor 108 whereby the no-signal plate current flow through the winding of relay 106 connected in the plate circuit for tube T9 is insufficient to operate the relay. This combination bias is preferably utilized to obtain a resonable compromise between sensitivity and independence of line voltage variation.

The normally-open contact of slide relay 106 remains open at all times except when the negative bias applied to tube T9 is overcome during the recording or reproduction of a control marker. The closure of this contact completes the energizing circuit for slide solenoid 117 thereby changing movie projector slides at the appropriate times during reproduction. The energization of slide solenoid 117 during recording is useful in viewing the slides while narrating the corresponding story. Manual operation of push-button 107 also completes the energizing circuit for slide solenoid 117.

The line potential appearing at line terminals 118 is applied to primary winding 112 of power transformer 111 when switch 114 is closed. The closure of switch 114 also applies the line potential to tape drive motor 113. The closure of switch 115 applies the line potential to lamp 116 which is associated with the slide projector. The high-voltage alternating-current potential developed by secondary winding 109 is applied to the anodes of full wave rectifier tube T10 whereby a high-voltage direct-current potential appears at the cathode of this tube which is supplied to the various tubes of the circuit as energizing potentials. The filter section comprising capacitor 61, resistor 62, and capacitor 66 filters the pulsating direct-current appearing at the cathode of tube T10 before its application to tube T8 through plate resistor 48 and to amplifier tubes T1, T2 and T3 through their associated resistor-capacitor filters. The energizing potential for the tube filaments are supplied by low-voltage secondary winding 110.

The detailed operation of the embodiment of this invention shown in combined Figs. 2 and 3 during recording is as follows:

Switch S1, having ganged sections A—E, is positioned to the record or R position thereby operatively preparing the circuit for the recording phase. With the closure of line switch 114, the primary winding 112 of power transformer 111 is energized, and tape drive motor 113 is also energized operatively advancing the recording tape or wire relative to the recording head connected to the jack 79 and the erase head connected to jack 80. The lower-voltage potential induced in filament winding 110 energizes the filaments of the vacuum tubes in the circuit, and the high-voltage potential induced in secondary winding 109 is rectified by full-wave rectifier T10 and applied to the various tube stages through the filter sections hereinbefore identified, with the exception of the power amplifier stage comprising tube T4 and its associated components. It will be recalled that during recording an audio output at speaker 59 is not required and that any necessary monitoring can be accomplished by connecting a headphone or speaker to monitoring jack 67.

When plug 12 is inserted into microphone-input jack 13, sound frequencies impinging upon microphone 10 are translated into modulated electrical currents which are amplified by the record amplifier comprising tubes T1, T2 and T3 with subsequent transmission to jack 79 through capacitor 50, switch section S1–B, resistor 48, secondary winding 69, and switch section S1–D. The signal amplification of the record amplifier can be set to any desired level by manual adjustment of volume control potentiometer 33. Visual indication of the recording signal level is obtained by observing the neon-flickers at tube T5. Adjustment of this indication level to any desired value is obtained by setting the adjustable tap of potentiometer 60 to the required point relative to the overall potentiometer resistance.

When a control marker is to be recorded on the magnetic tape, push-button switch 11 is manually closed momentarily thereby shunting cathode resistor 94 with capacitor 95 and causing tube T8 to oscillate at the control marker frequency of approximately 45 cycles per second. The marker pulse produced is applied to the control grid of tube T2 through resistor 90 and switch section S1–E, with subsequent transmission to jack 79 after amplification by the audio stages comprising tubes T2 and T3.

The marker pulse is also applied after rectification to the control grid of tube T9 thereby operatively energizing relay 106 and causing the associated contact to complete the energizing circuit for slide solenoid 117. The energization of slide solenoid 117 is useful at this time as slides can be viewed while making the recording.

The detailed operation of the circuit during record reproduction or playback is as follows:

Switch S1, having ganged sections A—E, is transferred to the playback or P position thereby operatively preparing the circuit for the reproduction phase. Switch 114 is closed thereby energizing tape drive motor 113 so that it may operatively drive the recording tape relative to the record-playback head connected to jack 79. Switch 115 is closed thereby applying the energizing line potential to slide lantern 116 whereby the requisite visual slide projections can be made upon a screen.

The transfer of switch section S1–D from the R to the P position applies the output signal of the reproducing head appearing at jack 79 to the control grid of tube T1. The reproduced audio frequencies are amplified by tubes T1, T2 and T3 and applied to the control grid of power audio tube T4 through capacitor 50, switch section S1–B, and resistor 52 with audio reproduction at loud speaker 59. Tube T4 is energized during reproduction by potential applied from the cathode of tube T10 through switch section S1–C and resistor 58. In view of the fact that bias and erase currents are not required during the reproduction operation, the transfer of switch section S1–C from the record or R position to the playback or P position removes the energizing potential for the high-frequency oscillator comprising tubes T6 and T7.

The reproduced control marker pulses are amplified by tube T1 and transmitted through capacitor 31, switch section S1–E, resistor 90 and resistor 92 to the control grid tube of T8. In view of the fact that cathode resistor 94 is unbypassed during reproduction, tube T8 and its associated components operate as a narrow band amplifier for the marker signal frequencies thereby selectively driving tube T9. The positive alterations of these marker frequencies are integrated by capacitor 104 so as to overcome the negative bias applied to tube T9 thereby operatively energizing slide relay 106. The resulting closure of the associated relay contact completes the energizing circuit for slide solenoid 117 thereby actuating a slide changing mechanism not shown, and producing a change of projector slides in response to the reproduction of a control marker.

The second preferred embodiment of this invention shown in Fig. 4 operates in a manner which substantially corresponds to that previously discussed in conjunction with the circuit shown in Figs. 2 and 3. Certain novel modifications and improvements are included, however, to provide additional structural economy. Circuit components which are essentially identical in structure and operation to those shown in combined Figs. 2 and 3 are identified by the same reference characters.

It will be recalled in the circuit arrangement shown in combined Figs. 2 and 3, the high-frequency oscillator for generating the bias and erase current is operative during recording and inoperative during reproduction. Conversely, the power audio stage is operative during reproduction and inoperative during recording. Accordingly, a principal improvement in the second embodiment of the invention features a single stage for providing power audio amplification during reproduction and high-frequency erase and bias currents during recording. In particular, during recording tube T11 and its associated components comprise a high-frequency oscillator, and during reproduction this stage is converted into a power audio amplifier.

When tube T11 operates as an oscillator, high-frequency tank coil 216 having a tap connected to the tube cathode through bias resistor 220 couples the control grid of tube T11 to the anode thereof with resulting oscillations. The oscillation frequency is determined by the resonant frequency for coil 216 and its shunting capacitor 215. Grid-leak bias is provided by resistor 219 and its shunting capacitor 218. Capacitor 221 provides a low impedance shunt across the primary winding of output transformer 57 so as to effectively connect the anode of tube T11 to ground with respect to the high-frequency currents. A high-frequency bias potential for the record-playback head is applied to jack 79 from the ungrounded end of the tank circuit through capacitor 217 and switch section S1–D. It will be recalled that the record-playback head is connected to jack 79. The requisite high-frequency erase potential is applied to jack 80 through capacitor 214 from the center-tap connection of tank coil 216. It will be recalled that the erase head is connected to jack 80.

The audio signal developed across plate resistor 47 during recording is applied to jack 79 through capacitor 50, switch section S1–B and resistor 222.

At reproduction, switch section S1–B is transferred to the playback or P position thereby applying the audio signal developed across plate resistor 47 to the control grid of tube T11. The corresponding transfer of switch sections S1–G and S1–H from the R to the P position converts tube T11 from a high-frequency oscillator stage into an audio power amplifier. In particular, switch section S1–G connects the center tap connection of tank coil 216 to ground thereby decoupling the anode of T11 from the control grid thereof, and the transfer of switch section S1–H to the P position applies an intermediate value direct-current potential to the screen grid electrode of tube T11. Capacitor 221 is ineffective to short the primary winding of output transformer 57 at the relatively lower audio frequencies.

Microphone 10 is connected to input jack 201 by plug 200. Both plug 200 and jack 201 omit the contacts previously required in the circuit embodiment shown in combined Figs. 2 and 3 to provide for the generation of control markers in response to the closure of a microphone push-button switch. Closure of push-button switch 208, which may be chassis mounted or the like, provides for the generation of control markers.

The signals generated by microphone 10 are applied to the control grid of amplifier tube T1 through a parallel impedance path comprising capacitor 202 and resistor 203.

The record amplifier comprising tubes T1, T2 and T3 is modified so that all the base equalization is effective prior to the connection of the amplifier to tube T8 through switch section S1–E and resistor 92. This modification provides an extra safety margin with respect to the accidental tripping of the slide mechanism by voice frequencies. The network comprising capacitor 204, resistor 205, resistor 206 and switch section S1–F provides for different values of base equalization for recording and reproduction. Capacitor 207 which shunts the input for tube T2 was added to provide for circuit stabilization.

The control marker oscillator comprising tube T8 which was previously described as a balanced phase shift oscillator is advantageously modified to operate as a tapered phase-shift oscillator by a proper selection of associated component values. This modification provides improved stability with variation in tube constants and component tolerances. A tapered phase-shift oscillator differs from a balanced phase-shift oscillator in that it requires less gain to sustain oscillation. This fact makes it possible to use more negative feedback when tube T8 operates as an amplifier. A taper factor of 2 is advantageously employed in this circuit. This taper reduces the minimum gain required for oscillation from 29 to 16. As a result, 5 decibels additional negative feedback can be employed to attain the same gain and selectivity.

A series resistor 209 was included in the grid circuit of relay tube T9 to prevent excessive grid-current flow when a control marker pulse is applied thereto, and which would otherwise discharge capacitor 104 and cause relay 106 to chatter.

The biasing arrangement for relay tube T9 is also modified to accommodate the different amplitudes of the applied control marker pulses during record and playback. The amplitude of the control marker pulse during recording is approximately 10 times greater than that of the reproduced control marker pulse. In the circuitry of combined Figures 2 and 3 the bias of the relay tube T9 is kept to a minimum to insure high sensitivity during reproduction, and essentially the same bias voltage is used during the recording operation. In the circuit of Fig. 4, a high-value resistor 211 in series with resistor 210 is included in the cathode circuit for relay tube T9 to provide increased bias during recording. A high sensitivity level for relay tube T9 is maintained during reproduction by shorting resistor 211 to ground through switch section S1–I.

It is to be understood that the above-described arrangements are illustrative of the principles of this invention. Numerous other arrangements may be devised by those skilled in the art to which this invention pertains without departing from the scope of the invention.

Having thus described the invention, what is claimed as new and desired to be secured by Letters Patent is:

1. Apparatus for operating a control device in a desired program with respect to sound signals reproduced from a composite recording including control marker signals, comprising an audio amplifier, a sound signal generator connected to the amplifier input and recording means connected to the amplifier output during recording, playback means connected to the amplifier input and sound reproducing means connected to the amplifier output during reproduction, and a stage having means selectively rendering the stage operative as an oscillation generator or as a band-pass amplifier at the oscillation frequency, means connected to said stage during recording to selectively condition said stage as an oscillation generator, said stage being connected to said amplifier during recording to apply control marker pulses having a frequency outside the normal passband of said amplifier for recording by said recording means, and means connected to said stage during playback to selectively condition said stage as a band-pass amplifier, said stage being connected to said amplifier during reproduction to amplify selectively at the oscillation frequency the control marker signals whereby said control device is operated in response to the playback of the selectively amplified control markers.

2. Apparatus for operating a control device in a desired program with respect to sound signals reproduced from a composite magnetic record including control marker signals, comprising an audio amplifier, a sound signal generator connected to the amplifier input and a recording head connected to the amplifier output during recording, a playback head connected to the amplifier input and a loud speaker connected to the amplifier output during reproduction, and a stage having means including a controllable feed-back loop selectively rendering the stage operative as an oscillation generator or as a band-pass amplifier at the oscillation frequency, means connected to said stage during recording to selectively condition said stage as an oscillation generator, said stage being connected to said amplifier during recording to apply control marker pulses having a frequency outside the normal passband of said amplifier for recording by said recording means, and means connected to said stage during playback to selectively condition said stage as a band-pass amplifier, said stage being connected during reproduction to amplify selectively at the oscillation frequency the control marker signals whereby said control device is operated in response to the playback of the selectively amplified control markers.

3. Apparatus for operating a control device in a desired program with respect to sound signals reproduced from a composite magnetic record including control marker signals, comprising an audio amplifier, a sound signal generator connected to the amplifier input and a recording head connected to the amplifier output during recording, a playback head connected to the amplifier input and a loud speaker connected to the amplifier output during reproduction, and a stage having means including a controllable feed-back loop selectively rendering the stage operative as an oscillation generator or as a band-pass amplifier at the oscillation frequency, means connected to said stage during recording to selectively condition said stage as an oscillation generator, said stage being connected to said amplifier during recording to apply low-frequency control marker pulses having a frequency below the normal passband of said amplifier for recording by said recording means, and means connected to said stage during playback to selectively condition said stage as a band-pass amplifier, said stage being connected during reproduction to amplify selectively at the oscillation frequency the control marker signals whereby said control device is operated in response to the playback of the selectively amplified control markers.

4. Apparatus for operating a control device in a desired program with respect to sound signals reproduced from a composite magnetic record including control marker signals, comprising an audio amplifier, a recording microphone connected to the amplifier input during recording, a magnetic record-playback head connected to the amplifier output during recording and to the amplifier input during reproduction, a loud speaker connected to the amplifier output during reproduction, and a stage having means including a controlled feed-back loop selectively rendering the stage operative as an oscillation generator or as a band-pass amplifier at the oscillation frequency, means connected to said stage during recording to selectively condition said stage as an oscillation generator, said stage being connected to said amplifier during recording to apply low-frequency control marker pulses having a frequency below the normal passband of said amplifier for recording by said recording means, and means connected to said stage during playback to selectively condition said stage as a band-pass amplifier, said stage being connected during reproduction to amplify selectively at the oscillation frequency the control marker signals whereby said control device is operated in response to the playback of the selectively amplified control markers.

5. Apparatus for operating a control device in a desired program with respect to sound signals reproduced from a composite magnetic record including control marker signals, comprising an audio amplifier, a sound signal generator connected to the amplifier input during recording and a recording head connected to the amplifier output during recording, a playback head connected to the amplifier input and a loud speaker connected to the amplifier output during reproduction, and a stage having means including a controllable feed-back loop selectively rendering the stage operative as an oscillation generator or as a band-pass amplifier at the oscillation frequency, means connected to said stage during recording to selectively condition said stage as an oscillation generator, said stage being connected to said amplifier during recording to provide a phase-shift oscillator for applying low-frequency control marker pulses having a frequency below the normal passband of said amplifier for recording by said recording means, and means connected to said stage during playback to selectively condition said stage as a band-pass amplifier, said stage being connected during reproduction to amplify selectively at the oscillation frequency the control marker signals whereby said control device is operated in response to the playback of the selectively amplified control markers.

6. Apparatus for operating a control device in a desired program with respect to sound signals reproduced from a composite magnetic record including control marker signals, comprising an audio amplifier having input, intermediate input, intermediate output and output terminals, a recording microphone connected to the amplifier input terminals during recording, a magnetic record-playback head, means connecting the head to the amplifier output terminals during recording and to the amplifier input terminals during reproduction, a stage having a feed-back loop selectively controllable during recording to generate low-frequency control marker pulses having a frequency below the normal passband of said amplifier and during reproduction to amplify selectively the control marker signals at the oscillatory frequency for the stage, means connecting said stage to the intermediate input terminals of said amplifier during recording and to selectively actuate said feed-back loop to apply marker pulses to the amplifier for recording, and means connecting said stage to the intermediate output terminals of said amplifier during playback to selectively actuate said feed-back loop to produce selective amplification in said stage whereby said control device is operated in response to the playback of the selectively amplified control markers.

7. Apparatus for operating a control device in a desired program with respect to sound signals reproduced from a composite magnetic record including control marker signals, comprising an audio amplifier having input, intermediate input, intermediate output and output terminals, a recording microphone connected to the amplifier input terminals during recording, a magnetic record-playback head, means connecting the head to the amplifier output terminals during recording and to the amplifier input terminals during reproduction, a stage having a feed-back loop selectively controllable during recording to provide a phase-shift oscillator for generating low-frequency control marker pulses having a frequency below the normal passband of said amplifier and during reproduction to amplify selectively at the oscillator frequency the control marker signals, means connecting said stage to the intermediate input terminals of said amplifier during recording to selectively actuate said feed-back loop to apply marker pulses to the amplifier for recording, and means connecting said stage to the intermediate output terminals of said amplifier during playback to selectively actuate said feed-back loop to produce selective amplification in said stage whereby said control device is operated in response to the playback of the selectively amplified control markers.

8. Apparatus for operating a control device in a desired program with respect to sound signals reproduced from a composite magnetic record including control marker signals, comprising an audio amplifier having input, intermediate input, intermediate output and output terminals, a recording microphone connected to the amplifier input terminals during recording, a magnetic record-playback head, means connecting said head to the amplifier output terminals during recording and to the amplifier input terminals during reproduction, a first stage including means to selectively operate the stage as a high-frequency bias and erase current oscillator during recording and as an audio power stage during reproduction, means applying the output of said stage to said head during recording, means connecting said stage to the output of the audio amplifier during playback, a second stage having a feedback loop controllable during recording to generate low-frequency control marker pulses having a frequency below the normal passband of said amplifier and during reproduction to amplify selectively at the oscillator frequency the control marker signals, means connecting said second stage to the intermediate input terminals of said amplifier during recording to selectively actuate said feed-back loop to apply marker pulses to the amplifier for recording, and means connecting said stage to the intermediate output terminals of said amplifier during playback to selectively actuate said feed-back loop to produce selective amplification in said stage whereby said control device is operated in response to the playback of the selectively amplified control markers.

9. Apparatus for operating a control device in a desired program with respect to sound signals reproduced from a composite magnetic record including control marker signals, comprising an audio amplifier having input, intermediate input, intermediate output and output terminals, a recording microphone connected to the amplifier input terminals during recording, a magnetic record-playback head, means connecting said head to the amplifier output terminals during recording and to the amplifier input terminals during reproduction, a first stage including means to selectively operate the stage as a high-frequency bias and erase current oscillator during recording and as an audio power stage during reproduction, means applying the output of said stage to said head during recording, means connecting said stage to the output of the audio amplifier during playback, a second stage having a feedback loop controllable during recording to provide a phase-shift oscillator for generating low-frequency control marker pulses having a frequency below the normal passband of said amplifier and during reproduction to amplify selectively at the oscillator frequency the control marker signals, means connecting said second stage to the intermediate input terminals of said amplifier during recording to selectively actuate said feed-back loop to apply marker pulses to the amplifier for recording, and means connecting said stage to the intermediate output terminals of said amplifier during playback to selectively actuate said feedback loop to produce selective amplification in said stage whereby said control device is operated in response to the playback of the selectively amplified control markers.

References Cited in the file of this patent

UNITED STATES PATENTS

| | | |
|---|---|---|
| 1,909,765 | Jenkins et al. | May 16, 1933 |
| 2,529,097 | Mullin | Nov. 7, 1950 |